Jan. 24, 1939.  R. J. VAN SCHIE  2,144,695
AUTOMOBILE BUMPER GUARD
Filed Dec. 17, 1937   2 Sheets-Sheet 2
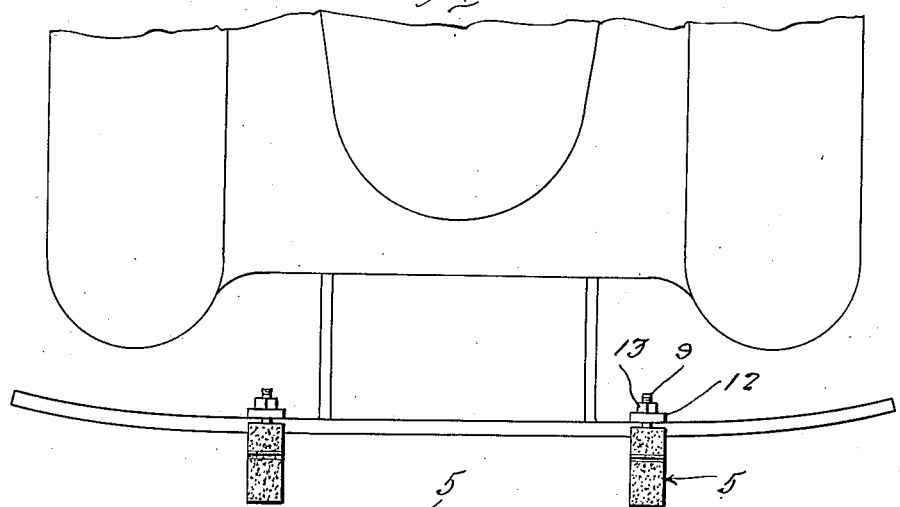
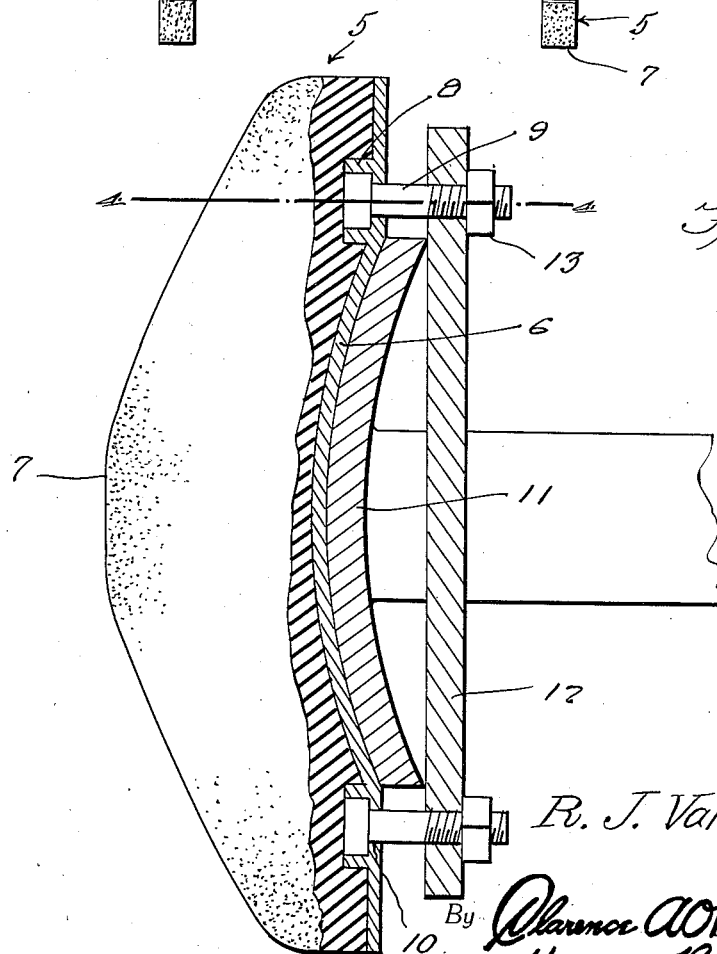
Inventor
R. J. Van Schie
By Clarence A. O'Brien
Hyman Berman
Attorneys Patented Jan. 24, 1939

2,144,695

UNITED STATES PATENT OFFICE 2,144,695

AUTOMOBILE BUMPER GUARD

Robert J. Van Schie, Grand Rapids, Mich.

Application December 17, 1937, Serial No. 180,467

1 Claim. (Cl. 293—55)

This invention relates to automobile bumpers and more particularly to guards therefor.

An object of the present invention is to provide a guard which may be quickly and easily mounted on an automobile bumper to protect the automobile from injury as sometimes happens by one automobile coming into violent contact with another, and as may readily occur, for example, in getting into and out of a parking space.

In accordance with the present invention the bumper guard includes a resilient buffer and means for readily attaching the buffer to the bumper of the vehicle.

Figure 1:
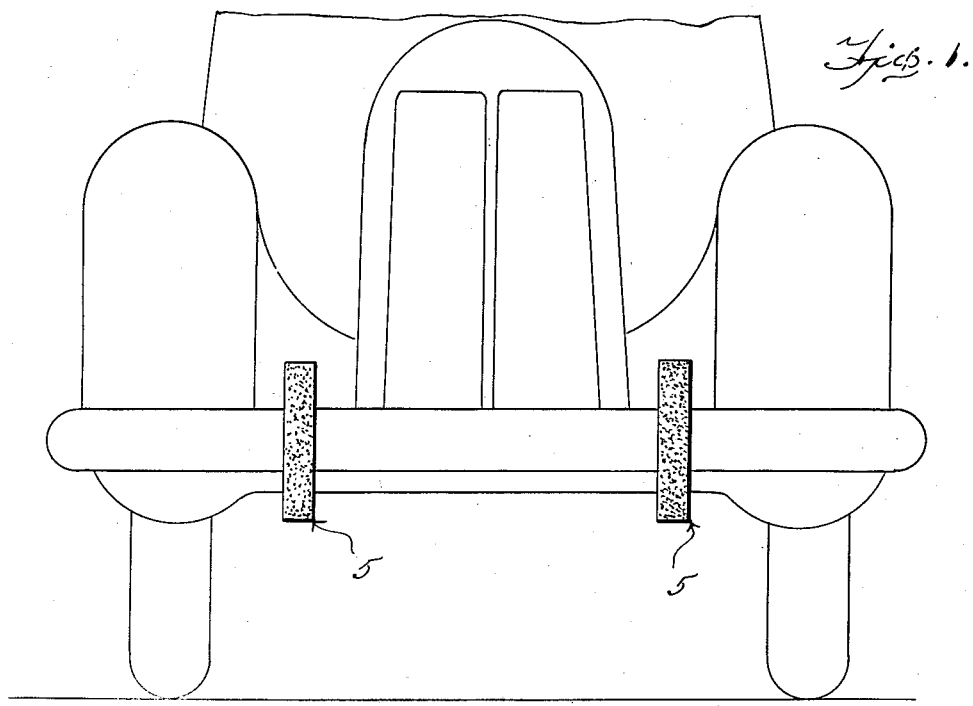
Figure 4:
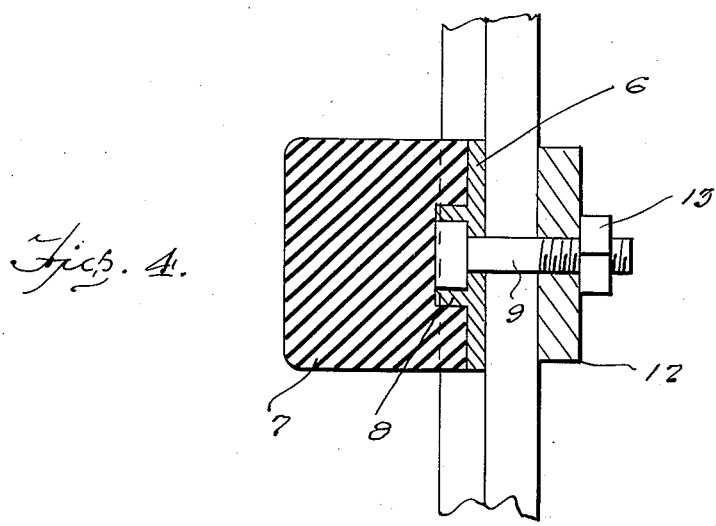

The invention together with its objects and advantages will be best understood from a study of the following description taken in connection with the accompanying drawings wherein:

Figure 1 is a front elevational view illustrating the application of the invention to the front bumper of an automobile, Figure 2 is a top plan view further illustrating the application of the invention, Figure 3 is a vertical sectional view, and Figure 4 is a horizontal sectional view taken substantially on the line 4—4 of Figure 3.

Referring to the drawings by reference numerals it will be seen that in accordance with the present invention the improved bumper guard indicated by the reference numeral 5 comprises a base plate 6 of metal, and permanently attached to one side of the plate 6 is a buffer 7 of suitable shape and design and formed wholly of rubber.

Adjacent the opposite ends thereof the body plate 6 is formed with integral square sockets 8 that are embedded within the buffer 7 and accommodate the heads of attaching bolts 9, the shanks of which bolts extend through openings 10 provided therefor in the bar 6 concentric to the sockets 8. Thus it will be seen that the bolts 9 are permanently associated with the bumper guard and consequently the loss of these bolts is effectively guarded against, as is also the rotation of the bolts.

For cooperation with the body plate 6 for clamping the guard 5 to an automobile bumper 11 there is provided a clamping plate 12 which adjacent its opposite ends is provided with openings for receiving the free ends of the shanks of the bolts 9. With the nuts 13 threaded home on the bolts the bumper 11 will be positively clamped between the body plate 6 and clamp plate 12 to the end that the guard 5 will be effectively and securely mounted on the bumper.

In the present instance I have shown the plate 6 as being longitudinally curved or bowed intermediate its ends in order to conformably engage the transversely curved bumper 11.

It will be seen that I have thus provided a bumper guard which may be readily mounted on the automobile bumper and in actual practice the guard 5 may be used in pairs as is obvious.

It is thought that a clear understanding of the construction, utility and advantages of an invention of this character will be had without a more detailed description.

Having thus described the invention what is claimed as new is:

A guard for bumpers comprising a rigid backing plate arranged vertically in front of a bumper and including intermediate and end portions, said intermediate portion being arcuately curved in the direction of said end portions to engage and match a convex front face of the bumper with said end portions extending above and below the bumper and both lying in the same vertical plane, said end portions having bolt openings, angularly related rigid walls formed on the end portions about the openings to form bolt head receiving sockets, bolts extending through the openings above and below the bumper and including heads having angularly related faces matching the walls of the sockets, a straight clamping plate engaging the rear face of the bumper and provided with openings to receive the bolts and paralleling the backing plate, nuts threaded on the bolts and bearing against the clamping plate, and a solid cushion member mounted on the backing plate and having the walls of the sockets embedded therein for aiding in securing the cushion member in place on the backing plate, said cushion member acting to prevent the bolt heads from moving out of the sockets and thereby assuring against rotation of the bolts in the openings of the backing plate during the threading of the nuts thereon and the heads of the bolts being confined in the sockets prevents the bolt heads from damaging the cushioning member.

ROBERT J. VAN SCHIE.